United States Patent
Purcell et al.

(10) Patent No.: US 7,072,924 B1
(45) Date of Patent: Jul. 4, 2006

(54) METHOD AND APPARATUS FOR GENERATING RANDOM NUMBERS FOR USE IN A FIELD PROGRAMMABLE GATE ARRAY

(76) Inventors: Stephen Clark Purcell, 365 Preston Dr., Mountain View, CA (US) 94040; Scott Kimura, 2178 Paseo Del Oro, San Jose, CA (US) 95124; Rajeshwaran Selvanesan, 231 Dixon Landing Rd., #259, Milpitas, CA (US) 95035

( * ) Notice: Subject to any disclaimer, the term of this patent is extended or adjusted under 35 U.S.C. 154(b) by 0 days.

(21) Appl. No.: 10/711,115

(22) Filed: Aug. 25, 2004

Related U.S. Application Data (62) Division of application No. 09/925,155, filed on Aug. 8, 2001.

(51) Int. Cl.
*G06F 1/02* (2006.01)

(52) U.S. Cl. .................................... 708/256; 708/253

(58) Field of Classification Search .............. 708/253, 708/256
See application file for complete search history.

(56) References Cited

U.S. PATENT DOCUMENTS

| | | | |
|---|---|---|---|
| 5,048,086 A | | 9/1991 | Bianco et al. |
| 5,446,683 A | * | 8/1995 | Mullen et al. ............... 708/256 |
| 6,594,680 B1 | * | 7/2003 | Gu et al. ..................... 708/256 |
| 6,813,625 B1 | * | 11/2004 | Smeets ........................ 708/250 |

* cited by examiner

*Primary Examiner*—Tan V. Mai
(74) *Attorney, Agent, or Firm*—Townsend and Townsend and Crew LLP (57) ABSTRACT

A method and apparatus for generating random number outputs utilized in generating a noise function at a given location in space. The method consists of partitioning selected portions of the random number generation process to achieve outputs in parallel. The relevant parallel outputs are weighted by effect and then summed together to give the amplitude of the noise function at the given location.

18 Claims, 8 Drawing Sheets

METHOD AND APPARATUS FOR GENERATING RANDOM NUMBERS FOR USE IN A FIELD PROGRAMMABLE GATE ARRAY

This application is a divisional of U.S. patent application Ser. No. 09/925,155, filed Aug. 8, 2001, which is incorporated by reference.

BACKGROUND OF THE INVENTION

The invention relates generally to programmable devices. More specifically, the invention relates to generating of random number sequences in programmable electronic devices.

One technique utilized in image rendering (i.e., representing a real-world three-dimensional scene or image onto a two-dimensional screen or device) is that of random and noise function generation. Creating realistic textures for surfaces of objects when they are rendered often involves summing the amplitude of noise functions at certain locations within the space confined by the scene. These noise functions, which are usually frequency-limited, are evaluated at arbitrary locations by considering pulses (amplitudes created by the noise function) within a particular radius of those arbitrary locations.

Figure 1:
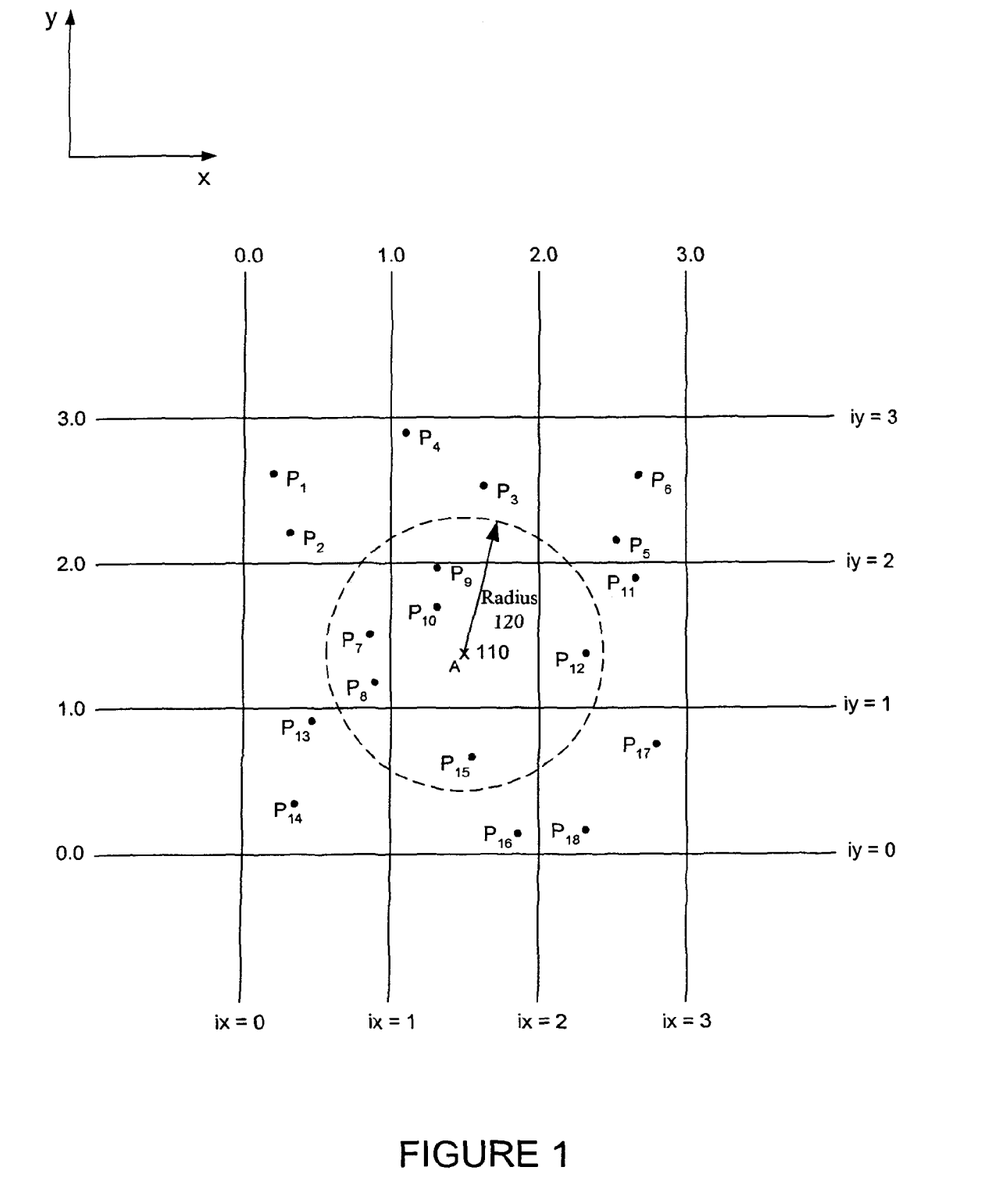
FIG. 1 illustrates a two-dimensional grid of pulses.

The number of "dimensions," d, may vary depending on the spatial characteristics of the desired noise function. For instance if a 2-D texture from a noise function is desired, then d is 2 (with coordinates x and y, for example). If a 3-D texture that is in motion is desired, then the number of dimensions d, would be 4 (with coordinates x, y, z, and t). FIG. 1 shows an arbitrarily chosen location 110 in a two-dimensional grid 100. The grid 100 is subdivided into integer multiples of both horizontal (x) and vertical (y) axes. If a given location A has coordinates (x, y) then the integer portion is represented by (ix, iy) and the fractional portion (Fx, Fy). Likewise, in grids with a 3rd dimension z, the integer portion is represented by iz, and the fractional portion by Fz. In systems using a fourth dimensional component(motion), t, has an integer representation "it" and a fractional representation Ft.

Assume, for purposes of illustration, that only a two-dimensional texture mapping is contemplated. Referring to FIG. 1, the sum of pulses at an arbitrary point A 110 is found by computing a series of (Fx, Fy, w)=Random($iA_x$, $iA_y$, n) where n is variable tracking which of the pulses are being computed/generated, Fx, Fy are fractional coordinate components of the pulse being computed/generated, iAx, iAy are the integer coordinate components of the location A and w is the weight of the computed pulse. Likewise, if considering three-dimensional texture mapping, then(Fx, Fy, Fz, w)=Random(iAx, iAy, iAz, n), and if four-dimensional, then (Fx, Fy, Fz, Ft, w)=Random(iAx, iAy, iAz, iAt, n). The total number of pulses considered within a given cell can be fixed to a certain number. FIG. 1 shows each cell having two pulses, and thus exemplifies N=2. Each cell is referred to by the coordinates of its bottom-left vertex. The sum of pulses at an arbitrary location A 110, is found by summing the pulses that lie within a radius 120 of A 110. Pulses $P_9$ and $P_{10}$ are all of the total of two pulses within cell (1, 1), and these are included within the area swept by radius 120 about location A 110. Likewise, both of the pulses $P_7$ and $P_8$ in cell (0, 1) also lie within the area swept by radius 120 about location 110. However, in cell (2, 1), only one of the two pulses, namely pulse $P_{12}$, lies within the area swept by radius 112 about location A 110. The other pulse $P_{11}$, lies outside the area of interest and thus, would not contribute to the sum of pulses. Likewise, pulse $P_{15}$ of cell (1, 0) lies within the area swept by radius 112 about location A 110 while pulse $P_{16}$ lies outside. Pulses $P_{13}$ and $P_{14}$ of cell (0, 0), pulses $P_3$ and $P_4$ of cell (1, 2), pulses $P_{17}$ and $P_{18}$ of cell (2, 0), pulses P1 and P2 of cell (0, 2) and pulses $P_5$ and $P_6$ of cell (2, 2) lie outside the area of the circle and do not contribute to the sum of pulses.

One way of computing the location of these pulses and their weights is to generate random number sequences representing the coordinates and the weights of each pulse. If a computed pulse location lie outside of the circle (of radius 112 about point A 110), then its weight does not contribute to the sum of pulses.

Figure 2:
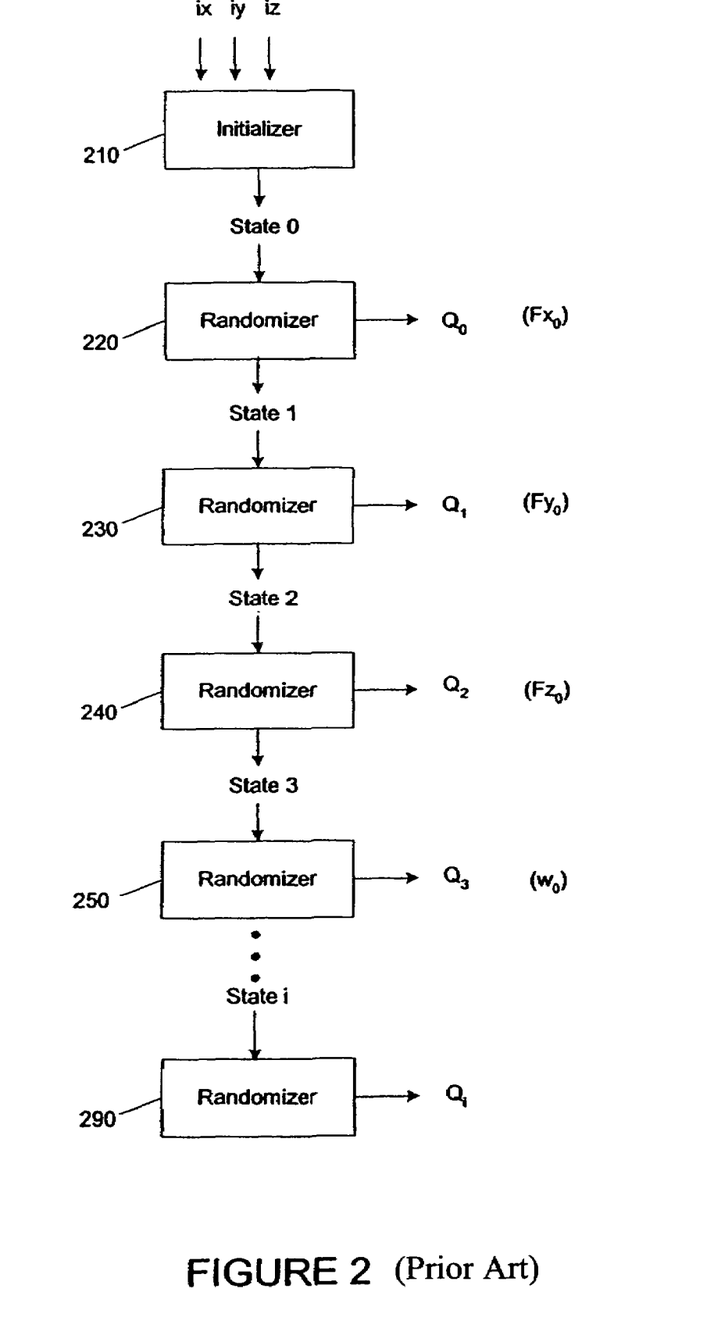
FIG. 2 is an example of a conventional random number sequence generator.

FIG. 2 is an example of a conventional random number sequence generator. Assuming an input of three dimensions, the integer coordinate components, ix, iy, and iz, of a chosen point, are input to initializer 210 to produce a first state $STATE_0$. Initializer 210 may be a hash function or similar mechanism. The state $STATE_0$ is input to a randomizer 220 to produce a first random number $Q_0$. In a serial fashion, the next state $STATE_1$ is produced as an effect of randomizing $STATE_0$ with randomizer 220. $STATE_1$ is fed to the randomizer 230 (similar to randomizer 220) to produce a second random number $Q_1$ as well as the next state $STATE_2$. $STATE_2$ is fed to the randomizer similar to randomizer 220) to produce a third random number $Q_2$ as well as the next state $STATE_3$. $STATE_3$ is fed to the randomizer similar to randomizer 220) to produce a fourth random number $Q_3$ as well as the next state. Likewise, any state $STATE_i$ needed to produce output $Q_i$ must be first produced by randomizing a state $STATE_{i-1}$. Thus, such randomizers are essentially serial in nature. Where cycle time performance is critical and outputs must be produced in parallel, such techniques cannot be used. For instance, in producing the fractional coordinate components (Fx, Fy, Fz) and the weight w at the location given by those fractional coordinate components, each random number would represent one of those components. Thus, $Q_0$ would represent $Fx_0$, $R_1$ would represent $Fy_0$, $Q_2$ would represent $Fz_0$ and finally, $Q_3$ would represent $W_0$. Each of the outputs is available only after the previous states are produced. The serial nature of generating these outputs is inconvenient where performance speed is vital. Where parallel random number generators are used, and these are implemented in hardware, the cost/space of hardware logic blocks increases dramatically.

Thus, there is a need for a technique for random number generation that operates in a parallel fashion and can minimize the number of hardware blocks involved.

BRIEF SUMMARY OF THE INVENTION

What is disclosed is a method and apparatus for generating random number outputs utilized in generating a noise function at a given location in space. The method consists of partitioning selected portions of the random number generation process to achieve outputs in parallel. The parallel outputs approximate the true random number outputs. The approximate outputs are tested to see if the pulse that corresponds to the outputs is relevant to the noise function. If relevant, the exact version of the random number output is generated. The weight of each pulse (as represented by the full random number output) is modified by an effect factor, based upon the distance between the pulse location (represented by the full random number output) and the given location. The effect weighted pulses are summed together to give an amplitude of the noise function at the given location.

DETAILED DESCRIPTION

In brief, the invention consists of partitioning selected portions of the random number generation process to achieve outputs in parallel. A number of inputs, which may vary based upon the number of dimensions being considered, are fed to a first stage P which utilizes a designed multilevel XOR selection circuitry to produce a first result. The result of P is then fed to a second stage F, which again utilizes a designed XOR selection circuitry, to produce the random number output. The random number output consists of the fractional coordinate component of the pulse location as well as a weight for the pulse. If M random number outputs are desired, stage F circuitry is replicated M times, with each parallel "module" F taking the same result of the single stage P as one of its inputs. The designed XOR selection circuitry are prewired to select certain registers and will vary their output because the inputs to the registers will also vary at each module. Because the level of parallelism does not affect the first stage of the generation process, the total number of configurable logic blocks can be reduced. Also, the random number output is divided into two phases, the first of which represents an approximation of the output of the other phase, and is used to estimate its relevance of the output to the summation process. The replicated M stage F modules all produce phase 1 (approximate) outputs. The phase 1 outputs are tested to see which probably lie within the circle of interest. Those pulses that do then have their phase 2 (full resolution) outputs computed by phase 2-type stage F modules, which can be designed to be fewer in number than the M phase I-type stage F modules.

Figure 3:
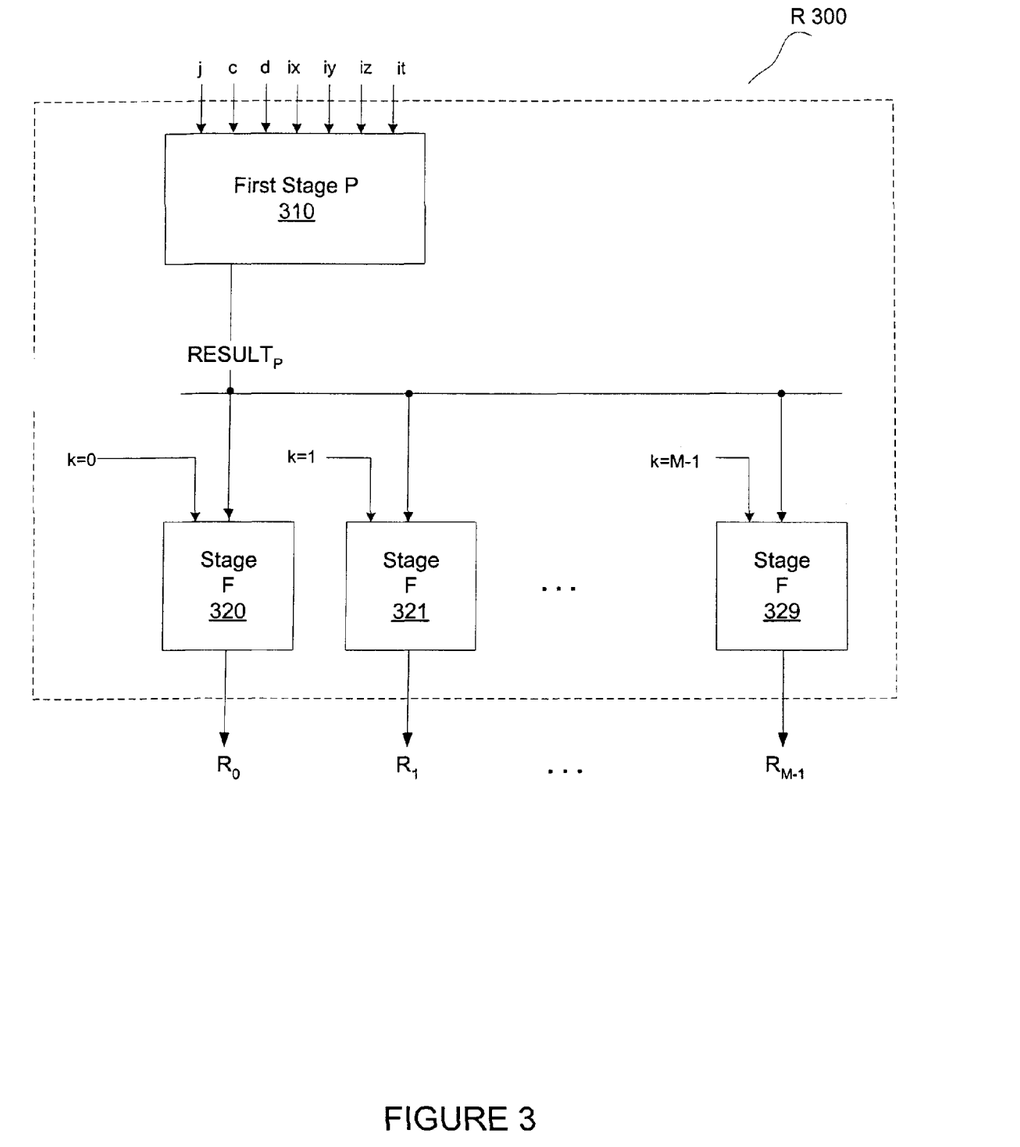
FIG. 3 illustrates an overview of the invention according to one or more embodiments.

FIG. 3 illustrates an overview of the invention according to one or more embodiments. The random number generator R 300 splits the computation of R into two primary stages. The first stage P 310 takes an input j, where j ranges from 0 to N−1 div M where N is the total number of the pulses being considered and M is the parallelism of the second stage (stage F) circuitry (each stage F circuitry is referred to as a "module"). For a given set of M random number outputs, j does not vary. A second input k, bypasses the first stage P 310, and is an input to the M stage F modules. The input k ranges from 0 to M−1 and is input along with selected output from first primary stage P 310 to a stage F module. A value of k=0 and the result from stage P (RESULT$_p$) is input to stage F module 320. A value of k=1 and the same "RESULT$_p$ is input to stage F module 321. Each random number output, in accordance with the invention, is given by R$_k$=F(P(j), k). At each cycle (given by a particular value of j), the generator 300 produces M resulting random number outputs representing the pulses being considered (given by k. The ability to bypass the input k at the first stage reduces the total number of configurable logic blocks (CLBs) needed (since the circuitry for P does not heed to be duplicated for each k). Each random number output R$_k$ contains the fractional coordinate components and the weight of the pulse.

Other logic, discussed below, determines the relevance of the computed pulse locations and sums the weights of the pulses based upon their relevance. To reduce the number of logic blocks in the circuitry, in some embodiments of the invention, the M stage F modules produce approximations of the full random number output. The approximate computed locations are measured for their relevance (i.e., whether the pulses approximately fall within the area of interest). For those pulses considered relevant, other stage F modules that produce the exact random number outputs are initiated. The pulse weights are modified according to their effect upon (distance from) the location A. The modified sums are then accumulated to give the amplitude of the noise function at the location A.

Figure 4:
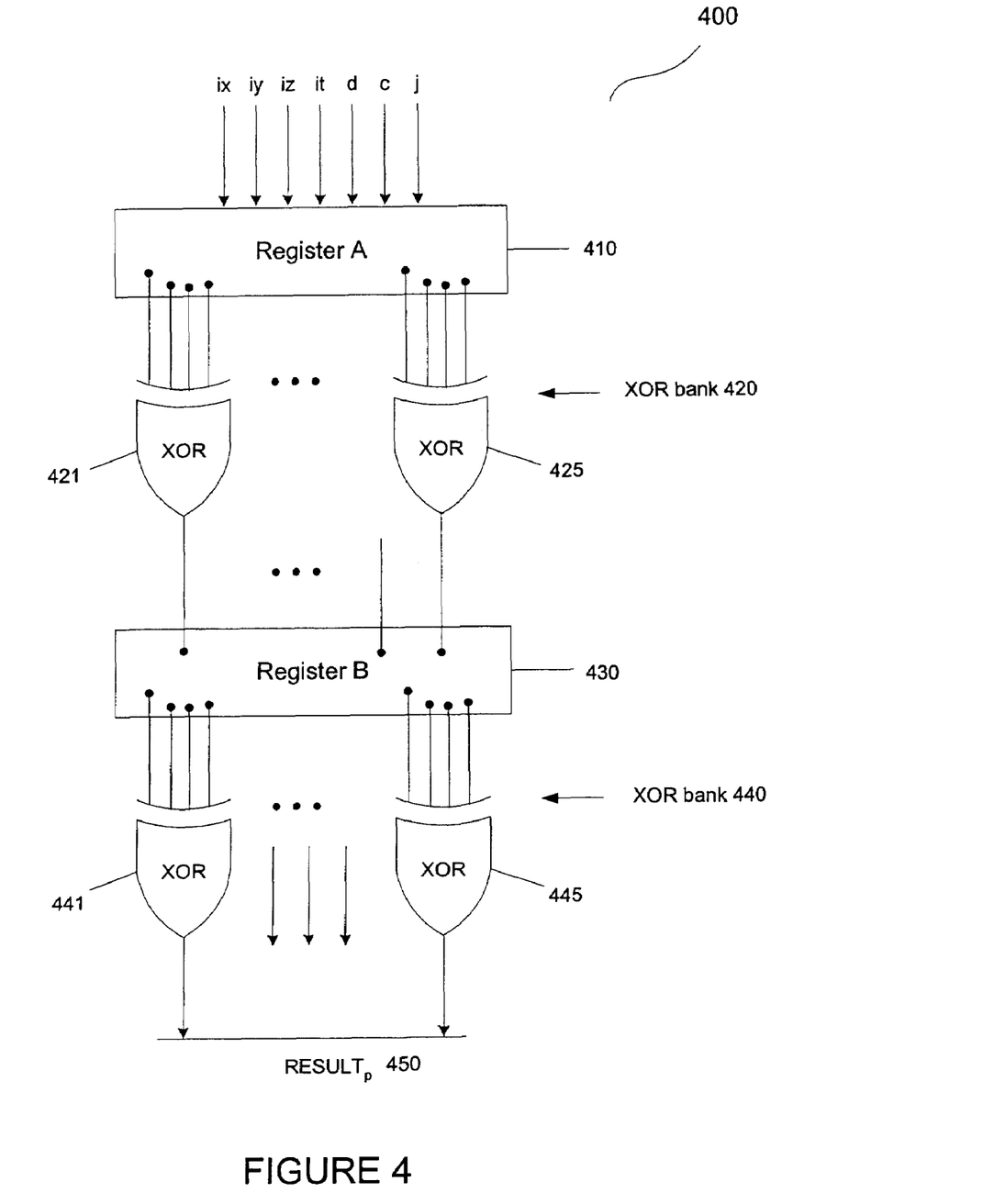
FIG. 4 depicts an exemplary embodiment of the first stage of a partitioned random number generator according to one or more embodiments of the invention.

FIG. 4 depicts an exemplary embodiment of the first stage of a partitioned random number generator according to one or more embodiments of the invention. The first of two primary stages, designated as stage P 400, is depicted. The inputs to stage P 400 are predicated upon the number of total dimensions d, in the grid being considered. The number of dimensions d may range from 1 to 4, and as depicted in FIG. 4, the d considered here is d=4. Thus, there are 4-dimensional coordinate inputs, ix, iy, iz, and "it," to the stage 400. If d=3, then the dimensional coordinate inputs would number 3, namely ix, iy and iz. The number of the cycle, j, described above, is also input to stage P 400. An input "C" is a count of which component of the output is being generated, if the function R is separable component by component.

All of the inputs shown, ix, iy, iz, "it", d, c and j are input in binary and form a large sequence of individual bits. These input bits are stored in register A 410. According to the invention, prior to run-time, the register A 410 is prewired to a XOR bank 420. In one embodiment, the wiring provides four of the input bits as inputs to each XOR in the XOR bank 420. The register can be wired to the XORs at arbitrarily selected locations. To ensure that all input bits are well represented, the wiring can be arranged so that there are no connections to the same two register locations for a given XOR. The wiring can also be arranged to minimize the number of register locations being wired more than once. However, the average rate of registers being wired more than once depend primarily on three factors: the number of inputs to each XOR, the total number of register locations and the total number of outputs (XORs in the XOR bank 420) needed. For instance, if each of the dimensional coordinate inputs are 10 bits (with four dimensions, a total contribution of 40 bits), and inputs d and care 2 bits each and j is 5 bits, a total of forty-nine bits would be stored in register A 410. In such an example, assume also that each XOR accepts 4 inputs and that a total of 32 outputs, and therefore, 32 XORS, need to be wired from the forty-nine active locations. The first 12 of the 32 XORs could be wired to have exclusivity of bits within each XOR and between each XOR. The remaining XORs would repeat some of the register locations previously represented, but could be done so in a different arrangement for each XOR. If A is the number of register locations, B is the number XORs and C is the number of inputs to each XOR, then a given register location (inputs to register A 410) is repeated to the XOR bank on average B*C/A times.

In the above example, each input bit would be repeated an average of 32*4/49 or approximately 2.6 times. The permutations and combinations of these bits need not be repeated, in most cases, in any design of wiring. According to one embodiment of the invention, the wiring of the registers to XOR is done at random, in which case some repeat above the average may occur. If all register locations are evenly represented, then the design could completely ignore even inter-XOR repetitions of the same register location. For instance, in the above example of a repeat every 2.6 times, the first 24 XORs (2 groups of 12 XORS) may have, by design, only wired a register location exactly twice, while the remaining 8 XORs may have a configuration which would not necessarily ensure that even a given one of the 8 XORs has a repeated register location as input.

Thus, referring to FIG. 4, XOR bank 420 is shown with a first XOR 421 and another XOR 425. The other XORs that may be needed in XOR bank 420 to produce the needed number of outputs are not specifically depicted for simplicity. XOR 421 may be in the first group of XORs within XOR bank 420 that do not repeat bits inter-XOR or intra-XOR. Thus, all four wire connections between XOR 421 and register A 410 are to different register locations as are other XORs within the group. However, XOR 425 may be part of a group that repeats a register location previously represented or even, repeats a connection to a register location within its 4 inputs.

The outputs of XOR bank 420 are input to a register B 430. The number of inputs to register B 430 equal the number of outputs provided by XOR bank 420. Thus, these two numbers are inter-related. The inputs to register B 430 are stored in register locations therein. Like register A 410, XORs of a XOR bank 440 are wired selectively to various locations of register B 430. The results of the XORs in XOR bank 440 form the bits of the final result, $RESULT_p$, for the entire stage P 410. The number of XORs in XOR bank 440 are dependent primarily upon the number of bits desired for the result of the stage P 410. The wiring arrangement between XORs such as XOR 441 and XOR 445 and the register locations of register B 430 are arbitrary and a matter of design choice. It may be required, for instance, that there be no inter-XOR repetition (where a given XOR is wired twice to the same register location), and the wiring can be arranged to so accommodate. The number of inputs for register B 430 are strictly speaking, arbitrary and a matter of design choice, but should provide a good sampling for generating the final result of the stage P 400. At the same time, the choice of number of inputs for register B 430 should avoid coincidences and correlations that would be visible in the final output $RESULT_p$ 450. This multilevel selection process within stage P 400 ensures a well seeded random result for $RESULT_p$ and could be designed to minimize coincidences between a given $RESULT_p$ and any others. The output of stage P $RESULT_p$ is fed to each of the M parallel stage F modules, and does not vary among any of them.

Figure 5:
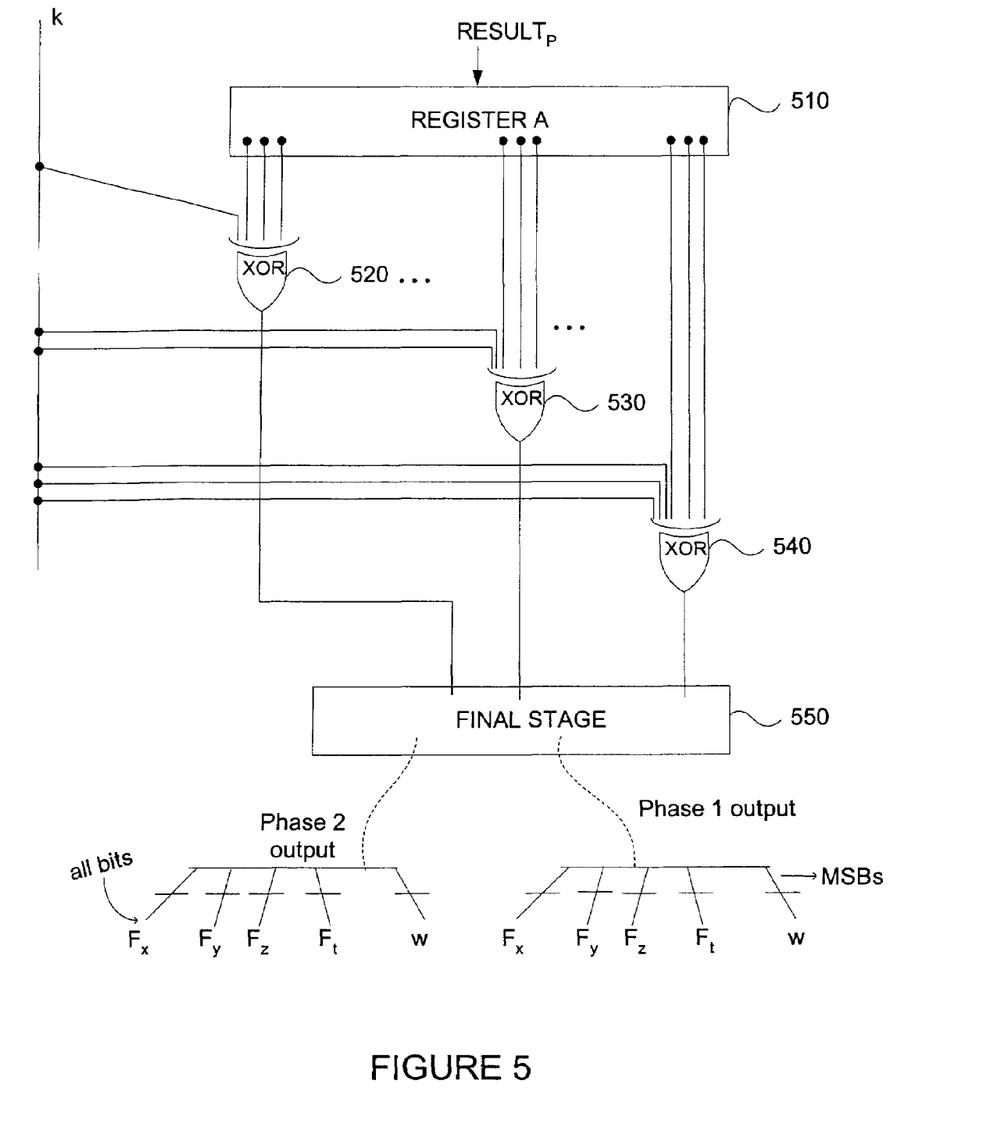
FIG. 5 depicts an exemplary embodiment of the second stage of a partitioned random number generator according to one or more embodiments of the invention.

FIG. 5 depicts an exemplary embodiment of the second stage (stage F) of a partitioned random number generator according to one or more embodiments of the invention. The second stage module F 500 is replicated M times depending upon the desired parallelism in the generator. The higher the value of M, the more parallel outputs and thus, better performance. However, a high M also means more cost in terms of the number of circuits that must be employed. Thus, M can be optimized depending upon the tradeoff between performance and cost. The second stage module F 500 takes a first input $RESULT_p$ and k, which is the particular pulse being considered in each parallel module in a given cycle. The input k is a number of bits representing the parallel module number and has a number of bits given by $\log_2$ M. A number of XORs, such as XOR 520, XOR 530, and XOR 540, are wired to various, arbitrary locations in register A 510. Each of the XORs may have a different number of inputs to them. For instance, XOR 520 has total of four inputs, while XOR 530 has a total of five inputs and XOR 540, six total inputs. Each of the XORs 520, 530, and 540 are wired/connected to three locations of register A 510. The remaining inputs to each of the XORs 520, 530, and 540 are derived from the input k. In the example depicted in FIG. 5, XOR 520 takes one bit of k as one input, while XOR 530 takes two bits of k as two inputs thereto and XOR 540 takes three bits of k as inputs thereto. The choice of which bits of k are taken as input to a particular XOR are arbitrary and may be wired at design time as are the XORs themselves. For instance if k is a three bit number, one XOR that takes two bits of k could select the first two bits as its input while another XOR taking only two bits of k selects instead the last two bits of k as input. The number of XORs needed to be wired to register A 510 will depend upon the total number of outputs and output bits of the entire random number generator R.

The outputs of XORS, such as XOR 520, 530, and 540, are wired to a final stage 550 which generates the random number outputs. Final stage 550 is a register that provides the random number outputs. Each stage F "module," such as module 500, can be designed to provide either approximate (phase 1) or exact (phase 2) random number outputs. In phase I-type stage F modules, only a fixed number" of most significant bits of the random number output are provided by final stage 550. In phase 2-type stage F modules, all of the bits of the random number output (i.e. the exact version) are provided by final stage 550. The number of XORs that need to be wired to the final stage F 550 and register A 510 depend on whether the module is a phase I-type module or a phase 2-type module. For instance, assuming that the random number computation was performed for a four-dimensional grid in 16-bit precision. In a phase 2-type module, the final stage 550 would provide a 16-bit number for each of 5 outputs, four for the dimensional coordinate component outputs and one for the weight of the pulse. In a phase I-type module, the final stage 550 may only provide the most-significant bits of each number, for example, the five most significant bits. The phase I-type module output can be used to estimate the relevance of the pulse to the summation process. If the pulse is relevant (within the area of consideration about a location A, see FIG. 1), then the phase 2-type module output is provided. Otherwise, the phase 2-type module output is not provided at all. The phase 2-type module would have, for instance, 80 XORs (if 16 bits each output component and five output components). The phase I-type modules would have only 25 XORS, 5 for each of 5 output components. The entire random number generator may have only a few (less than M) phase 2-type modules, and have M phase I-type modules. If the number of relevant pulses (for which exact, phase 2 outputs are needed) exceeds the number of phase-2 type modules, the available phase-2 type modules would have to be re-used to generate the additional outputs.

Figure 6:
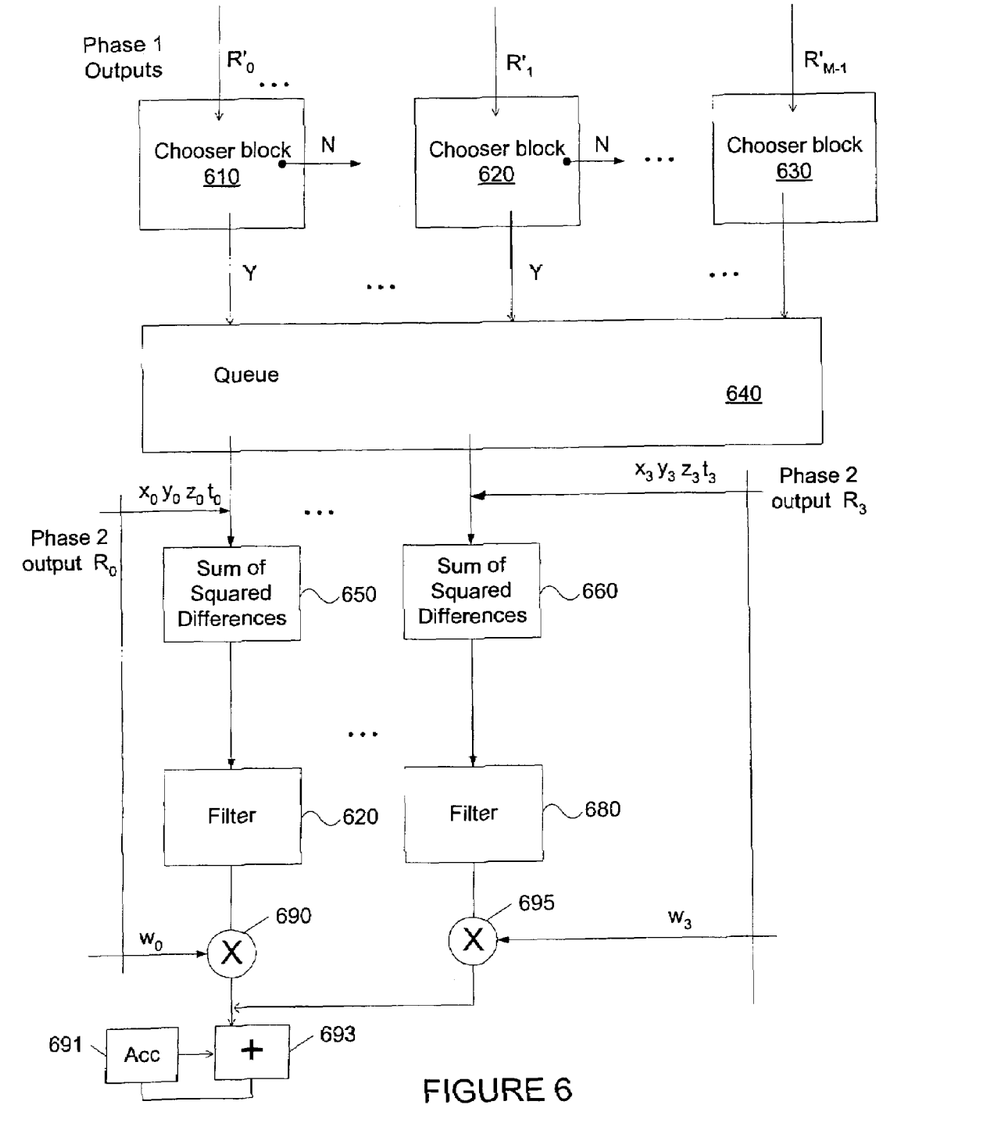
FIG. 6 illustrates an architecture for summing computed pulses according to one or more embodiments of the invention.

FIG. 6 illustrates an architecture for summing computed pulses according to one or more embodiments of the invention. Each phase I-type parallel second stage module (of which there are M), which contains stage F 500, produces a random number output $R_i'$ which is an approximation of $R_i$. The M random number outputs from phase 1-type modules, namely $R''_0, R'_1, R'_2, \ldots R'_{M-1}$, are fed to a respective chooser block. Hence, phase 1 random number output $R'_0$ is fed to a chooser block 610, while phase 1 random number output $R'_1$ is fed to a chooser block 620 and phase 1 random number output $R'_{M-1}$ is fed to a chooser block 630 and so on. In some implementations, the circuitry generating a phase 1 output and the circuitry generating a phase 2 output may be identical in nature.

Each chooser block tests the phase 1 output, which is an approximation of the (full) phase 2 output, to see whether it is approximately within the area of interest (i.e., within a circle of radius r about a location A). If it is within the area of interest, the corresponding full phase 2 random number output is forwarded onward. If not, the corresponding (full) phase 2 output is completely ignored. The results (either yes or no) for all M outputs are compiled in a queue 640. Queue 640 then wires the phase 2 outputs of each parallel second stage module yielding a result of yes (through its corresponding chooser block) to a sum of squared differences block. For instance, if the pulse corresponding to $R'_0$ is determined to be relevant to the summation, the corresponding phase 2 output $R_0$ is generated and provided to a sum of squared differences block 650. However, if the pulse corresponding to $R'_I$ is not determined to be relevant by chooser block 620, then corresponding phase 2 output $R_I$ would be not be generated, and thus, would not be further considered.

Each sum of squared differences block sums the square of the differences between (i.e. computes the square of the Euclidean distance between) the full phase 2 random number output $R_0$ and the location A. Assume $R_{0x}$ is the x coordinate component output of $R_0$, $R_{0y}$ is the y coordinate component output of $R_0$, $R_{0z}$ is the z coordinate component output of $R_0$ and $R_{0t}$ is the t coordinate component output of $R_0$. Likewise, assume $A_x$ is the x coordinate component of A, $A_y$ is the y coordinate component of A, $A_z$ is the z coordinate component of A and $A_t$ is the t coordinate component of A. Then sum of squared differences block 650 would compute:

$$S_0 = \sum_{i=x,y,z,t} (R_{0i} - A_i)^2 \quad (1)$$

Likewise, the sum of squared differences of any contributing (relevant) pulse is computed in its corresponding sum of squared differences block. For instance, the sum of squared differences $S3$ for the pulse represented by $R3$, would be computed by sum of squared differences block 680 as:

$$S_3 = \sum_{i=x,y,z,t} (R_{3i} - A_i)^2 \quad (2)$$

The outputs $S_0$ and $S_3$ each represent the distance between the location A and the computed random pulses $R_0$ and $R_3$, respectively. Each of these distances is used to index a filter table, such as a filter table 620. Filter table 620 and a filter table 650 each contains a table of distance-effect factors e indexed by distances. The lower the distance $S_i$ between $R_i$ and A, the greater the effect afforded to the corresponding pulse. Thus, if $S_i$ is high, the effect factor e will be low, and vice-a-versa. The relationship characterizing $S_i$ and $e_i$ is a design choice, and may be linear or nonlinear. The filter tables 620 and 650 provide an effect factor "$e_i$" for a given $S_i$.

The exact weight $w_i$ of each pulse, as computed by the random number generator, is a result output of each phase 2-type stage F. The exact weight $w_i$ is then multiplied by the corresponding effect factor $e_i$ by a multiplier. The output of filter 620 would be an effect factor $e_0$ which would then be multiplied by the weight $W_0$ using a multiplier 690. This product is summed with other such products using an accumulator 691 and summer 693. For instance, if sum of squared differences block 660 produces a distance $S_3$ for a pulse represented by $R_3$, then filter table 680 would produce an effect factor $e_3$. The effect factor $e_3$ is multiplied at a multiplier 695 by the weight $w_3$ of the corresponding pulse (which is provided for in the random number output $R_3$). This product is then summed with the number stored in accumulator 691 which has the accumulated products from other pulses. In general, the sum of pulses 8P is summarized by:

$$SP = \sum_{i \in \text{ all relevant pulses}} e_i * w_i \quad (3)$$

The embodiment of FIG. 6 shows parallel sum of squared differences and filter blocks for each output of queue 640. However, by scheduling the outputs to be sequentially processed, it may be possible in other embodiments to use only a single sum of squared differences block and filter block and feed each of the relevant phase 2 random number outputs thereto. Queue 640 could be used to schedule the outputs to the sum of squared differences and filter block. The accumulator 691 accumulates the sum of these scheduled products by summing its current value with each new product generated. In addition, the product outputs of the multipliers can be summed at an earlier stage prior to being accumulated by the adder 693 and accumulator 691.

Figure 7:
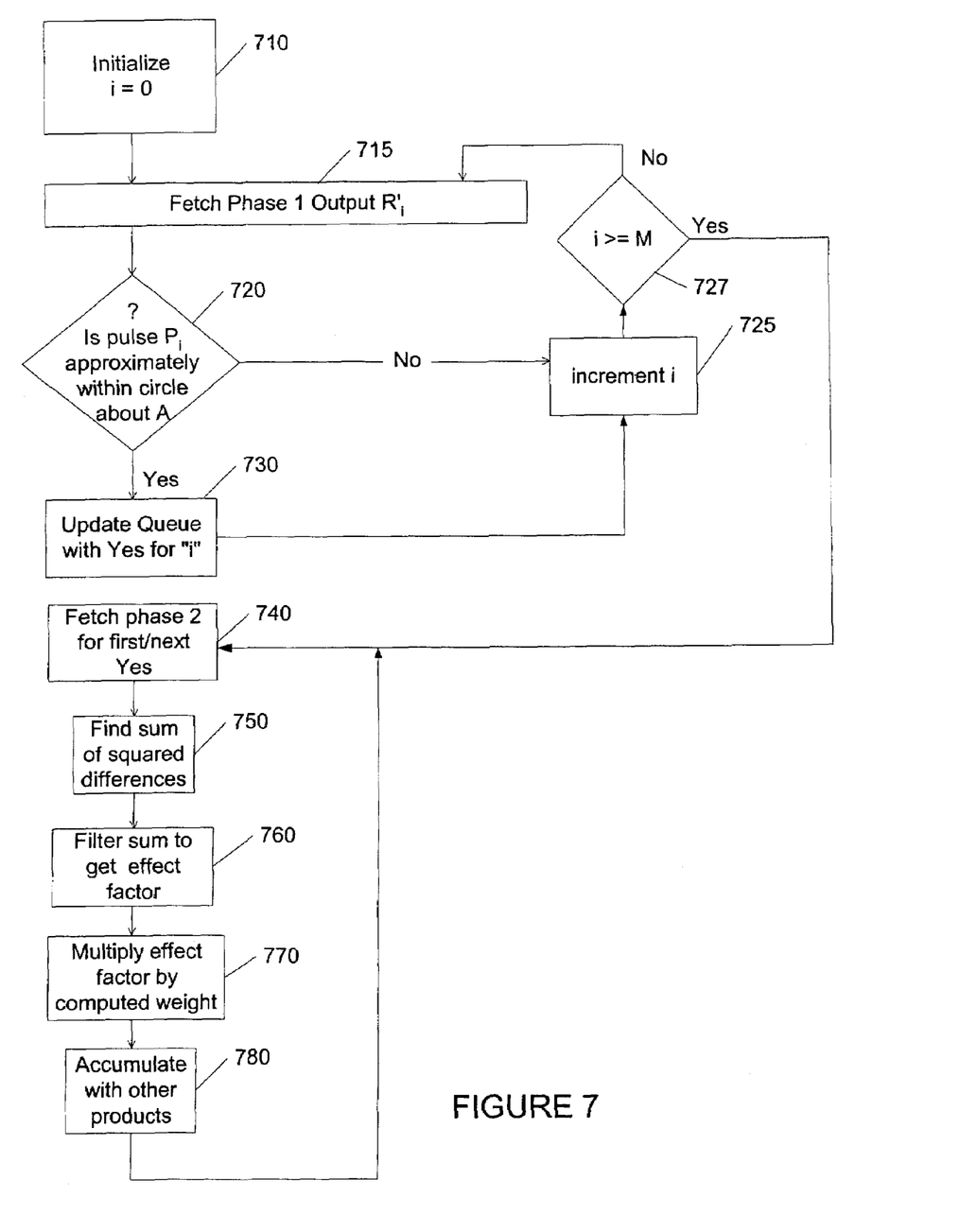
FIG. 7 is flowchart illustrating summation of pulses to generate a noise function output according to one or more embodiments of the invention.

FIG. 7 is flowchart illustrating summation of pulses to generate a noise function output according to one or more embodiments of the invention. A tracking variable i is initialized to zero, tracking which pulse is being considered (block 710). Next, the phase I-type module's output $R'_i$ is fetched (block 715). Initially, the output $R'_0$, which is an approximation of $R_0$, is fetched from the module providing it. The phase 1 output $R'_i$ is tested to see if the corresponding pulse $P_i$ approximately falls within a circle defined by a radius r about the point A, from which the pulses were computed (checked at block 720). Block 720 checks, as a measure of pulse relevance, whether:

|$P_{xyzt} - A_{xyzt}$| - allowable_difference < r, where $P_{xyzt}$ is the location of the pulse $P_i$, $A_{xyzt}$ is the point of interest and allowable difference is a tolerance level. If the above condition is satisfied (block 720 returns "yes"), then a queue is updated with a yes for the corresponding current value of i (block 730). If the condition is not satisfied, the queue is not updated for that value of i, and the queue holds its initialized value such as a zero. The variable i is then incremented (block 725). If i>=M, the number of random number outputs of the current hardware cycle, then all the phase 1 outputs will have been tested (checked at block 727). If not, testing continues with a fetch of another $R'_i$ (return to block 715).

If all phase 1 outputs have been tested, then each phase 2 output that corresponds to a pulse tested as relevant (as referred to in the queue) is fetched (block 740). The sum of squared differences (square of distance) $S_i$ between the exact pulse $P_i$ and the location A is computed (see above) (block 750). This sum is filtered (serves as index to a filter table) to obtain an effect factor $e_i$ (block 760). The effect factor $e_i$ is multiplied by the computed weight $w_i$ (which is part of the random number output) (block 770). The product is accumulated with other products (block 780) in an accumulator. The sum of all the products (effect weighted pulses) is the amplitude of the noise function at the location A.

Figure 8:
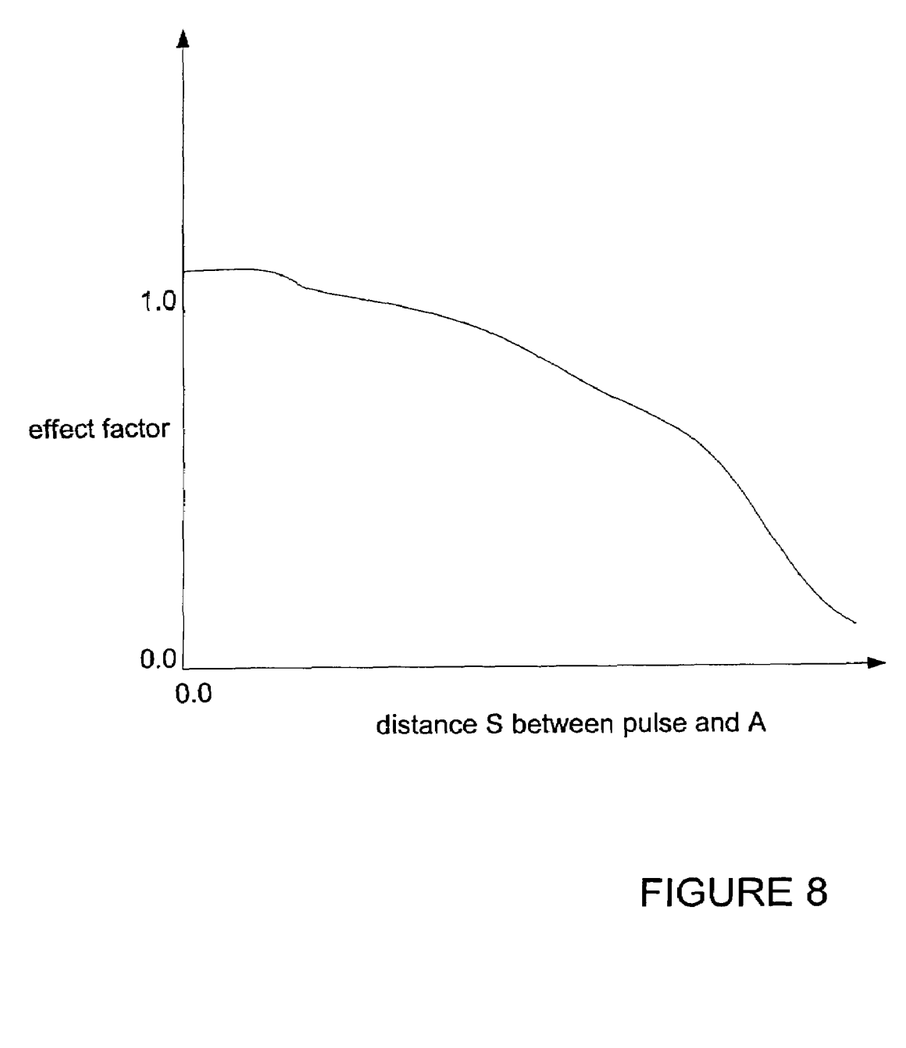
FIG. 8 is a sample filter table utilized in various embodiments of the invention.

FIG. 8 is a sample filter table utilized in various embodiments of the invention. The effect factor, which is represented on the y-axis, ranges from 0.0 to 1.0. A pulse which has a distance of 0.0 from A (i.e., is coincident with A) would probably be assigned an effect factor of 1.0. The distance, which is represented along the x-axis, ranges from 0.0 to r, where r is the radius of the circle of interest about location A. As the distance increases, the effect factor decreases, and thus pulses further away from the location A would have less effect upon the amplitude of the noise function, while closer pulses would have a greater effect.

Although the present invention has been described in detail with reference to the disclosed embodiments thereof, those skilled in the art will appreciate that various substitutions and modifications can be made to the examples described herein while remaining within the spirit and scope of the invention as defined in the appended claims. There are areas where those skilled in the arts may make changes and modifications and employ equivalents without departing from the spirit of the invention.

What is claimed is:

1. A method comprising:
   separating a random number generator into a single first stage and a second stage;
   replicating the circuitry of said second stage into M parallel modules; and
   generating M random number outputs using said single first stage circuitry and M parallel second stage modules,
   wherein each of said M modules has a first input which is the output result of said single first stage circuitry and a second input which is unique to said module,
   wherein said first stage circuitry has at least two first stage inputs, a first first stage input representing the integer coordinate components of a location of interest and a second first stage input representing a hardware cycle.

2. A method according to claim 1 wherein generating includes:
   storing said first stage inputs in a first register;
   selecting a first set of bits from said first register;
   storing said first set of bits in a second register; and
   selecting a second set of bits from said second register, said second set of bits representing said result of said single first stage circuitry.

3. A method according to claim 2 wherein for each parallel second stage module, generating further includes:
   storing said result of said single stage circuitry in a second stage register; and
   selecting a second set of bits from said second stage register, said second set of bits representing one of said M random number outputs.

4. A method according to claim 3 wherein said each random number output is one of a phase 1 output or a phase 2 output.

5. A method according to claim 4 wherein said phase 2 output is a full and exact representation of the desired random number output.

6. A method according to claim 5 wherein said phase 1 output is an approximation of said phase 2 output.

7. A method according to claim 2 wherein selecting said first set of bits includes:
   utilizing a group of XORs, each XOR having its inputs pre-wired to various locations of said first register, to select among the bits of said inputs.

8. A method according to claim 2 wherein selecting said second set of bits includes:
   utilizing a group of XORs, each XOR having its inputs pre-wired to various locations of said second register, to select among the bits stored therein.

9. A method according to claim 3 wherein said selecting in each parallel second stage module includes:
   utilizing a group of XORs, each XOR having its inputs wired to a number of bits representing the module number and to selected locations of said second stage register.

10. A method according to claim 9 wherein the wired number of bits representing the module number varies from XOR to XOR.

11. A method according to claim 9 wherein each parallel second stage module wires its XORs to its registers in an identical manner with all other parallel second stage modules.

12. An apparatus configured to generate M random number outputs on a given cycle j in a parallel fashion comprising:
    first stage circuitry configured to accept a series of inputs; and
    M second stage modules, the output of said first stage wired as an input of each of said M modules, the output of each module being one of said M random number outputs,
    wherein said series of inputs includes the cycle number j, the number of dimensions desired and integer coordinate components for each dimension desired.

13. An apparatus according to claim 12 wherein each said second stage module also includes an input k representing the number of the module.

14. An apparatus according to claim 13 wherein each second stage module comprises:
    a first register having locations configured to store each bit of said output of said first stage; and
    a bank of XORs having one set of inputs from said first register and a second set of inputs from the bits of input k, the output of each XOR representing one bit of said random number output.

15. An apparatus according to claim 14 wherein said M second stage modules produce an approximation of the full said random number output.

16. An apparatus according to claim 12 each said random number output contains a fractional coordinate component for each desired dimension as well as a weight of the corresponding pulse at the location given said fractional coordinate components and said integer coordinate components.

17. An apparatus according to claim 12 wherein said first stage circuitry comprises:
    a first register having locations storing each bit of said series of inputs; and a first bank of XORS, each input of each said XOR of said first bank coupled to an arbitrary one of said locations of said first register.

18. An apparatus according to claim 17 wherein said first stage circuitry further comprises:

a second register having locations storing each output of said first bank of XORs; and a second bank of XORs, each input of said XORs of said second bank coupled to an arbitrary one of said locations of said second register, each output of said second bank of XORs representing each bit of said output of said second stage.

* * * * *